(12) United States Patent
Oswalt

(10) Patent No.: US 7,730,097 B2
(45) Date of Patent: Jun. 1, 2010

(54) SMART DATABASE

(75) Inventor: Lonny Lee Oswalt, Monte Sereno, CA (US)

(73) Assignee: MobileFrame, LLC, San Jose, CA (US)

( * ) Notice: Subject to any disclaimer, the term of this patent is extended or adjusted under 35 U.S.C. 154(b) by 923 days.

(21) Appl. No.: 11/055,941

(22) Filed: Feb. 10, 2005

(65) Prior Publication Data

US 2005/0182785 A1  Aug. 18, 2005

Related U.S. Application Data

(60) Provisional application No. 60/544,736, filed on Feb. 12, 2004.

(51) Int. Cl.
*G06F 17/00* (2006.01)
(52) U.S. Cl. .................. 707/793; 707/803
(58) Field of Classification Search ............ 707/101, 707/100, 102, 103 R, 103 Z, 104.1, 793, 707/803
See application file for complete search history.

(56) References Cited

U.S. PATENT DOCUMENTS

| | | | | |
|---|---|---|---|---|
| 5,701,453 | A * | 12/1997 | Maloney et al. ............. | 707/2 |
| 5,704,029 | A | 12/1997 | Wright, Jr. | |
| 5,706,509 | A | 1/1998 | Man-Hak Tso | |
| 5,958,012 | A | 9/1999 | Battat et al. ............. | 709/224 |
| 6,243,859 | B1 * | 6/2001 | Chen-Kuang ............. | 717/111 |
| 6,289,380 | B1 | 9/2001 | Battat et al. ............. | 709/224 |
| 6,300,947 | B1 | 10/2001 | Kanevsky | |
| 6,301,581 | B1 * | 10/2001 | Smiley ............. | 707/103 R |
| 6,347,316 | B1 | 2/2002 | Redpath | |
| 6,757,696 | B2 | 6/2004 | Multer et al. | |
| 6,820,088 | B1 | 11/2004 | Hind et al. | |
| 6,925,477 | B1 | 8/2005 | Champagne et al. | |
| 6,947,943 | B2 | 9/2005 | DeAnna et al. | |
| 7,200,720 | B1 | 4/2007 | Yang et al. | |
| 7,266,370 | B2 | 9/2007 | Paddon et al. | |
| 7,464,067 | B2 * | 12/2008 | Chestnut et al. ............. | 707/1 |
| 7,565,381 | B2 | 7/2009 | Oswalt | |
| 7,577,911 | B2 | 8/2009 | Oswalt | |
| 2002/0033843 | A1 | 3/2002 | Loos et al. | |
| 2002/0040445 | A1 | 4/2002 | Flannigan et al. | |
| 2002/0066074 | A1 | 5/2002 | Jabri | |
| 2002/0147850 | A1 | 10/2002 | Richards et al. | |
| 2002/0194155 | A1 * | 12/2002 | Aldridge et al. ............. | 707/1 |
| 2003/0004955 | A1 | 1/2003 | Cedola et al. | |
| 2003/0014445 | A1 | 1/2003 | Formanek et al. | |

(Continued)

OTHER PUBLICATIONS

International Search Report, dated Nov. 1, 2005, PCT/US2005/04559.

(Continued)

*Primary Examiner*—Hosain T Alam
*Assistant Examiner*—Amy Ng
(74) *Attorney, Agent, or Firm*—Beyer Law Group LLP

(57) ABSTRACT

A solution is provided wherein only primary keys are used as meta-data to construct many-to-many relationships between table, resulting in amore robust, efficient database structure. Once tables of user-specific data are bound to the database as meta-data using their primary keys, the system may automatically ensure the handling of the records as related units. This eliminates the traditional heavy-weight dependence on foreign key relationships.

12 Claims, 7 Drawing Sheets

U.S. PATENT DOCUMENTS

| | | | |
|---|---|---|---|
| 2003/0018714 | A1 | 1/2003 | Mikhailov et al. |
| 2003/0055668 | A1 | 3/2003 | Saran et al. |
| 2003/0076349 | A1 | 4/2003 | Slaby |
| 2003/0135492 | A1* | 7/2003 | Kauffman et al. ............... 707/3 |
| 2003/0149762 | A1 | 8/2003 | Knight et al. |
| 2003/0179227 | A1 | 9/2003 | Ahmad et al. |
| 2003/0217053 | A1 | 11/2003 | Bachman et al. |
| 2003/0234808 | A1 | 12/2003 | Huang et al. |
| 2004/0181502 | A1* | 9/2004 | Yeh et al. ....................... 707/1 |
| 2005/0091233 | A1* | 4/2005 | Friske et al. ................ 707/100 |
| 2006/0242685 | A1 | 10/2006 | Heard et al. |
| 2007/0112574 | A1 | 5/2007 | Greene |
| 2007/0177571 | A1 | 8/2007 | Caufield et al. |

OTHER PUBLICATIONS

MobileFrame, Inc., "Valley Crest Proposal by Assignee", Feb. 20, 2003, 32 pages.
Office Action mailed Feb. 4, 2008, from U.S. Appl. No. 11/056,711.
Office Action Dated May 11, 2007 from U.S. Appl. No. 11/056,457.
Office Action Dated Oct. 18, 2007 from U.S. Appl. No. 11/056,585.
Office Action Dated Nov. 26, 2007 from U.S. Appl. No. 11/056,457.
Supplemental European Search Report dated Jun. 5, 2008 from EP Patent Application No. EP 05 71 3470.
Office Action Mailed Apr. 10, 2008 from U.S. Appl. No. 11/056,585.
Office Action Mailed May 14, 2008 from U.S. Appl. No. 11/056,457.
Office Action Mailed Oct. 15, 2008 from U.S. Appl. No. 11/056,457.
Office Action Mailed Sep. 10, 2008 from U.S. Appl. No. 11/056,585.
Office Action Mailed Aug. 20, 2008 from U.S. Appl. No. 11/056,711.
Office Action Mailed Nov. 21, 2008 from U.S. Appl. No. 11/056,457.
Office Action Mailed Dec. 29, 2008 from U.S. Appl. No. 11/056,585.
Office Action Mailed Feb. 4, 2009 from U.S. Appl. No. 11/056,711.
Office Action Mailed May 11, 2009 from U.S. Appl. No. 11/055,941.
"Sams Teach Yourself JavaScript in 24 Hours", Third Edition, Sams, Jun. 2002, "Getting Data with Forms Section".
Notice of Allowance Mailed Jun. 3, 2009 from U.S. Appl. No. 11/056,457.
Notice of Allowance Mailed Jun. 26, 2009 from U.S. Appl. No. 11/056,711.
Office Action Mailed May 27, 2009 from U.S. Appl. No. 11/056,585.

* cited by examiner

SMART DATABASE

CROSS-REFERENCE TO RELATED APPLICATION

This application claims priority based on Provisional Application Ser. No. 60/544,736, entitled "CONFIGURABLE MOBILE APPLICATION TO DYNAMICALLY CREATE ENFORCEABLE WORKFLOW" by Lonny Lee Oswalt, filed on Feb. 12, 2004, herein incorporated by reference in its entirety.

This application is related to co-pending application No. 11/056,711, entitled "INTEGRATED DEPLOYMENT OF SOFTWARE PROJECTS" by Lonny Lee Oswalt, filed on Feb. 10, 2005.

This application is related to co-pending application No. 11/056,585, entitled "INTELLIGENT RENDERING ON A MOBILE COMPUTING DEVICE" by Lonny Lee Oswalt, filed on Feb. 10, 2005.

This application is related to co-pending application No. 11/056,457, entitled "SMART SYNCHRONIZATION" by Lonny Lee Oswalt, filed on Feb. 10, 2005.

FIELD OF THE INVENTION

The present invention relates to the field of computer software. More specifically, the present invention relates to a smart database.

BACKGROUND OF THE INVENTION

A relational database stores data in a number of disparate tables, each of which is linked or related to another table. A table is organized by rows and columns, each row or record containing the same columns or fields. A conventional flat-file database would store all the data in a single table, but the relational model allows for maximum flexibility for querying the data. Data need only be brought together for a particular query, so the structure of the database contains no assumptions about what sort of queries may be required in the future. Another powerful feature of the relational model is that each data item appears only in a single place in the tables and thus only needs to be updated in one place when it changes.

In the relational model, each table has a primary key, which is a field or combination of fields that uniquely identifies each record in the table. The primary key provides a means to distinguish one record from all others in the table.

When a field in one table matches the primary key (or a candidate key) of another table, the field is referred to as a foreign key. The foreign key is the anchor on the many side of a one-to-many or many-to-many relationship, much as the primary or candidate key is the anchor on the one side of this relationship. A foreign key is a linchpin used to ensure that invalid data is not entered into a table. It also prevents a user from deleting or updating in a way that might leave orphan rows.

There are several different classes of relationships possible using a relational model. The first is a one-to-one relationship. Two tables are related in a one-to-one relationship if, for every row in the first table, there is at most one row in a second table. True one-to-one relationships seldom occur in the real world. This type of relationship is often created to get around some limitation of the database management software rather than to model a real-world situation. For example, one-to-one relationships may be necessary in a database when there is a need to split a table into two or more tables because of security or performance concerns. Tables that are related in a one-to-one relationship share the same primary key.

A second type of relationship is a one-to-many relationship. Two tables are related in a one-to-many relationship if, for every row in a first table, there can be zero, one, or many rows in a second table, but for every row in the second table there is exactly one row in the first table. The one-to-many relationship is also referred to as a parent-child or master-detail relationship.

A third type of relationship is a many-to-many relationship. Two tables are related in a many-to-many relationship when, for every row in a first table, there can be many rows in the second table, and for every row in the second table, there can be many rows in the first table. Many-to-many relationships can't be directly modeled in the typical relational database, and therefore these types of relationships must be broken into multiple one-to-many relationships. A third table, known as a linking table, may then be utilized to model the relationships between the two tables.

Regardless of the type of relationship used, past relational models utilized foreign keys for the "many" side of the relationship (except for one-to-one of course). These foreign keys, however, must be constantly managed to ensure that no errors occur in the storage of the data. This wastes both computing power and memory space. Additionally, the traditional heavy-weight dependence on foreign key relationships causes tables to have database enforced key constraints, which limits the ability of a user to easily add new tables or permutations.

What is needed is a solution that eliminates the traditional heavy-weight dependence on foreign key relationships in order to allow users to add new tables or permutations without restrictions.

BRIEF DESCRIPTION

A solution is provided wherein only primary keys are used as meta-data to construct many-to-many relationships between table, resulting in amore robust, efficient database structure. Once tables of user-specific data are bound to the database as meta-data using their primary keys, the system may automatically ensure the handling of the records as related units. This eliminates the traditional heavy-weight dependence on foreign key relationships.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Figure 1:
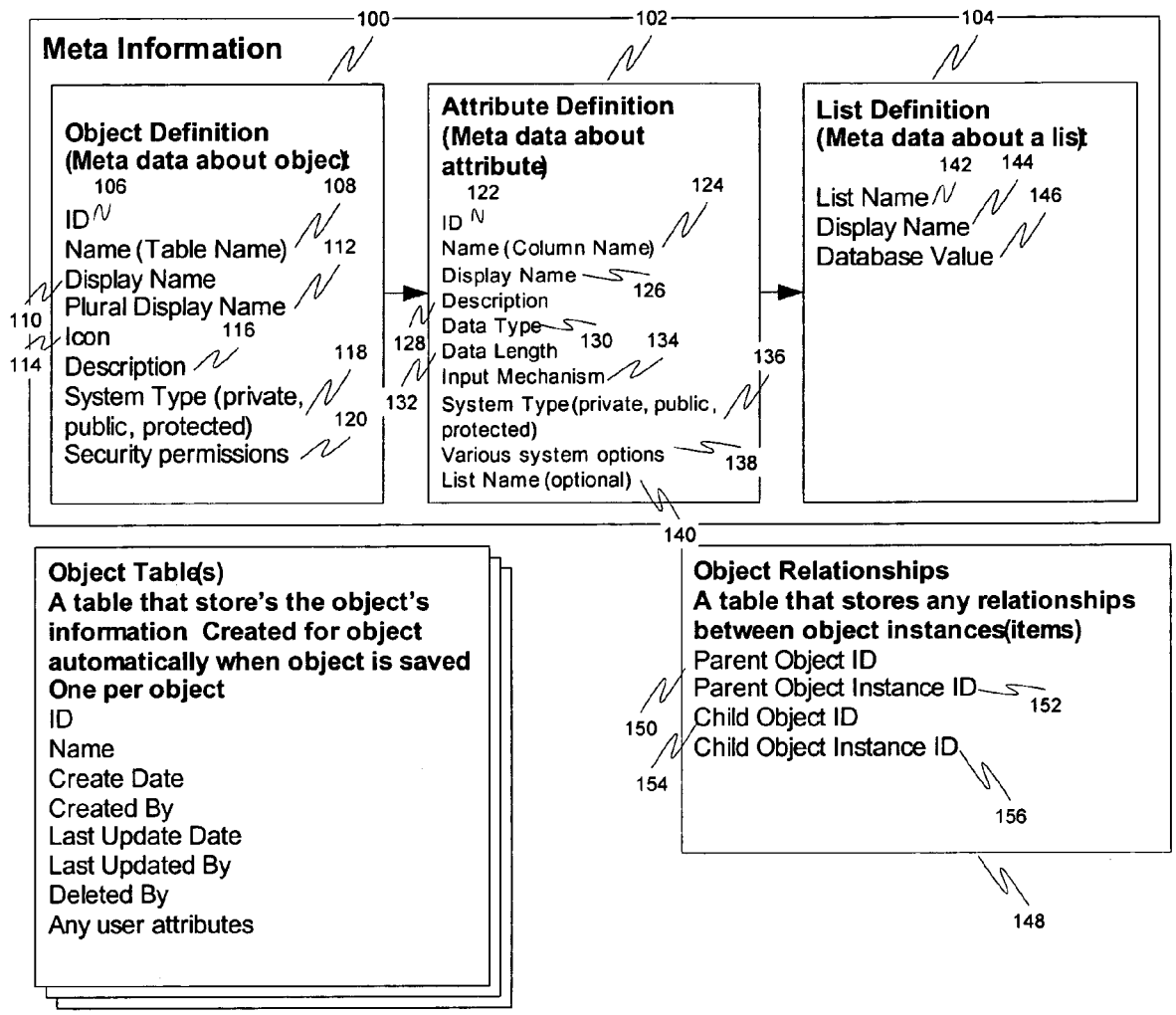
FIG. 1 is a diagram illustrating meta data in accordance with an embodiment of the present invention.

Embodiments of the present invention are described herein in the context of a system of computers, servers, and software. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

A solution is provided wherein only primary keys are used as meta-data to construct many-to-many relationships between table, resulting in amore robust, efficient database structure. Once tables of user-specific data are bound to the database as meta-data using their primary keys, the system may automatically ensure the handling of the records as related units. This eliminates the traditional heavy-weight dependence on foreign key relationships.

In an embodiment of the present invention, an object oriented design presents data in the database as objects and attributes. Data may be stored in a relational database, but may be accessed via a database access engine. All objects, attributes, and object definitions may then be stored in the database. This meta data may be read and used by the database access engine to present the system to the user and programmer.

In an embodiment of the present invention, the meta data for an object may describe its name, display names, icon, system type, and security attributes. The meta data for an object attribute (field) may describe its data type and length, input mechanism, display name, list valid values, system type, and other data. The database access engine may also support a "system type" for the object and/or attribute which allows the user to define a private, public, or protected object or field. A private object attribute is never visible or editable. A public object/attribute is visible and editable. A protected object/attribute is visible but not editable.

All user defined objects in the system may contain preset system fields that allow them to be recognized by the database access engine as a proprietary object and allow it to be involved in the various object support functions supported by the database access engine (relationships for example). The preset system fields may include an identification (the primary key), creation date, last update, created by, last updated by, name, and deleted by. The database access engine may maintain these system fields automatically. A record in the relational database management system may represent an instance of an object—also called an item. Furthermore, in an embodiment of the present invention, no record is ever physically deleted, but rather they are just marked as deleted. Archive functions may be provided to physically remove the item.

In an embodiment of the present invention, many-to-many relationships allow for any type of relationship to be modeled with no understanding of database concepts or redundancy of data. This relationship is made possible by a central relationship table. In an embodiment of the present invention, the relationship table may contain the parent object, the parent instance identification, the child object, and the child instance identification. Additionally, there are no database enforced key constraints on this table, allowing new tables or permutations to be added without restriction. All operations to make, remove, and search on the relationships in the relationship table maybe performed using the database access engine, which exposes this functionality as a set of objects with properties and methods. The system then may automatically prevent duplicate relationships or circular relationships from being defined.

In an embodiment of the present invention, a point and click interface may be utilized to design the objects. Additionally, the object definition may be serialized/deserialized for distribution to other installations of the smart database or for saving to disk for archiving purposes. The database model may provide for multiple types of objects to be created. Since all objects are exposed via the database access engine, the underlying logic to an object does not have to be a one-to-one correspondence to the relational table that a typical system would use to contain the data. Because the database access engine potentially exposes all functionality in object-oriented terms, SQL is not necessary or expected. Furthermore, the database access engine may handle all database management system-specific syntax.

In an embodiment of the present invention, the database access engine caches intelligently on an as-requested basis. Meta data is cached, for example, to prevent undue stress on the database platform. Caching of this type of information is done to give automatic performance boosts without having to understand indexes.

FIG. 1 is a diagram illustrating meta data in accordance with an embodiment of the present invention. As described above, meta data may be stored using one or more object definitions 100 along with linked attribute definitions 102, and potentially list definitions 104 as well. An object definition may describe meta data about an object, and may contain an identification 106, a name (which is in actuality a table name) 108, a display name 110, a plural display name 112, an icon 114, a description 116, a system type 118, and security permissions 120. The system type 118 may be private, public, or protected. The distinctions between these terms is described in more detail above.

Each object definition 100 has a link to one or more attribute definitions 102. Each attribute definition 102 may describe meta data about an attribute (or column) of the data, and may contain an identification 122, a name (which is in actuality a column name) 124, a display name 126, a description 128, a data type 130, a data length 132, an input mechanism 134, a system type 136, various system options 138, and a list name 140. If the attribute definition 102 contains a list name 140, then it is an indication that there is a list definition 104 linked to the attribute definition 102.

A list definition 104 may describe meta data about a list, and may contain a list name 142, a display name 144, and a database value 146.

When a relationship between two or more objects is created, information regarding the relationship may be placed in a relationship table. Relationships between objects are commonly referred to as parent-child relationships. The relationship table 148 may store, for each relationship, the parent object identification 150, the parent object instance identification 152, the child object identification 154, and the child object instance identification 156.

Figure 2:
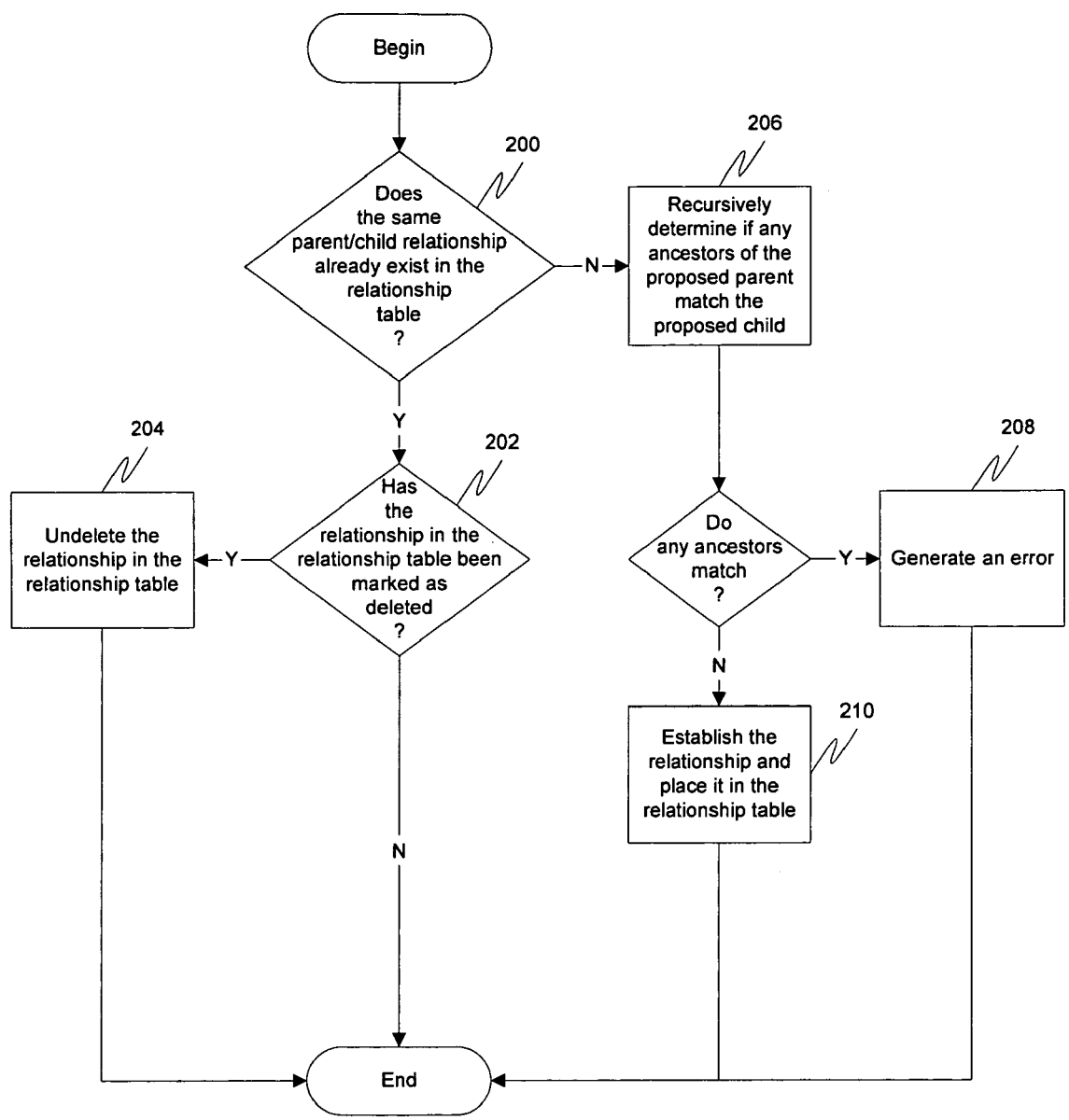
FIG. 2 is a flow diagram illustrating a method for handling a new relationship in accordance with an embodiment of the present invention.

As discussed briefly above, duplicate relationships and circular references may be avoided using an embodiment of the present invention. FIG. 2 is a flow diagram illustrating a method for handling a new relationship in accordance with an embodiment of the present invention. Each act of this method may be performed by software, hardware, or any combination thereof. At 200, the system may examine the relationship table to ensure that the same parent/child relationship doesn't exist. If the relationship does exist, the request has already been fulfilled. In one embodiment of the present invention, relationships that are deleted aren't actually removed from the relationship table, but are merely marked as "deleted". If it is the case that the relationship to be added matches one that is in the relationship table but marked as deleted, the system may simply undelete the old relationship, thus reestablishing it. Thus, at 202, it may be determined if the relationship in the relationship table has been marked as deleted. If so, then at 204, it may be undeleted.

If the relationship does not exist in the relationship table, then at 206, the system may determine recursively if any ancestors of the proposed parent match the proposed child. Since this is a recursive function, the system may first check parents of the proposed parent. Then it may check parents of parents of the proposed parent, and so on. In an embodiment of the present invention, the function may have a built in limit on the number of levels to recursively check (e.g., 10 levels), which will function as an upper limit on the number of levels to check, assuming the check hasn't run out of ancestors or a match has been found. If somewhere in this recursive check the proposed child was found to match an ancestor, at 208 an error may be generated. If the check passes, however, then at 210, the relationship may be established and placed in the relationship table.

When a user request that a relationship be broken, the system may simply label that relationship as deleted in the relationship table. The objects themselves may not be affected.

Figure 3:
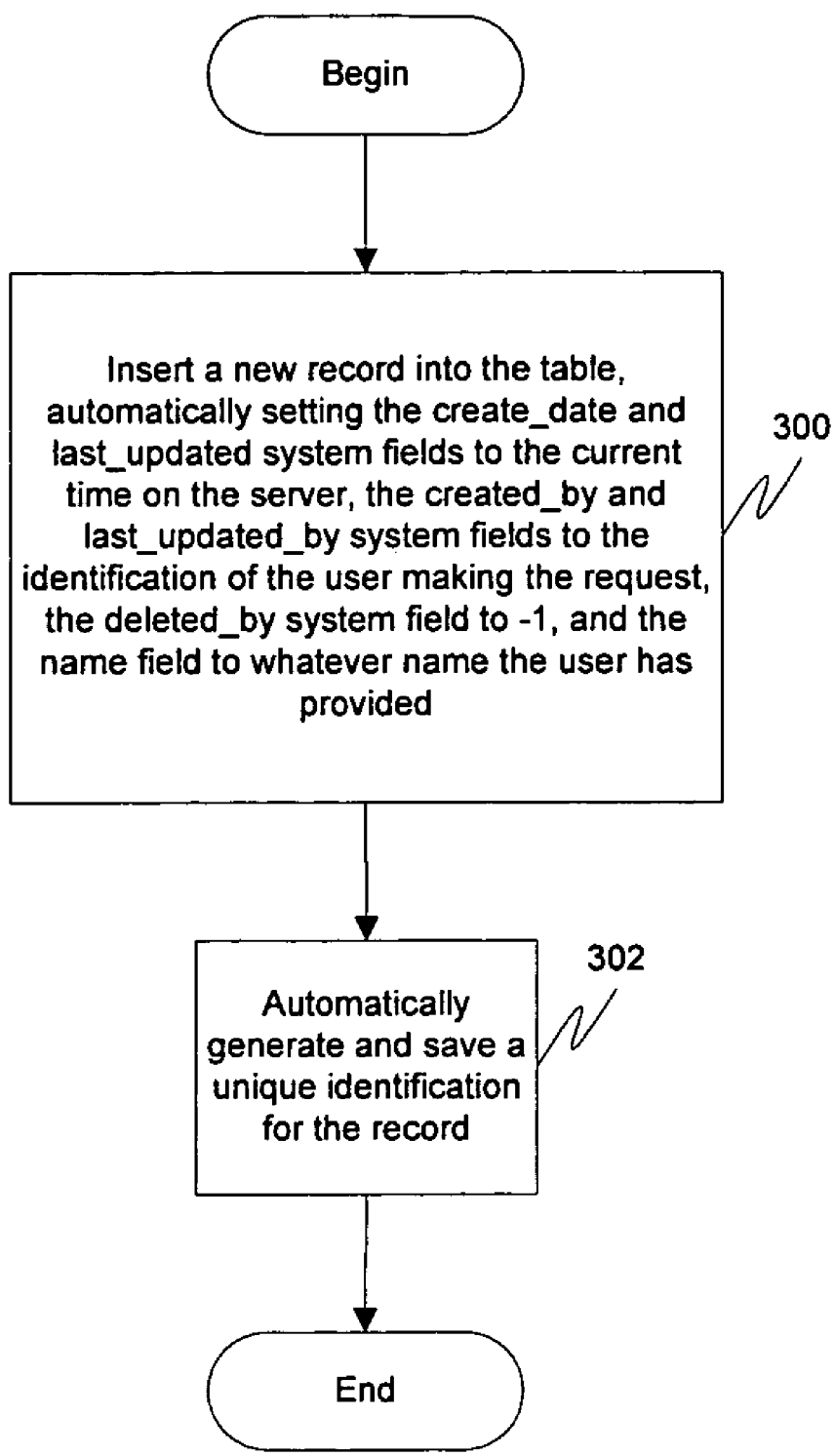
FIG. 3 is a flow diagram illustrating a method for inserting a new item of data into the database in accordance with an embodiment of the present invention.

FIG. 3 is a flow diagram illustrating a method for inserting a new item of data into the database in accordance with an embodiment of the present invention. Each act of this method may be performed by software, hardware, or any combination thereof. At 300, the system may insert a new record into the table, automatically setting the create_date and last_updated system fields to the current time on the server, the created_by and last_updated_by system fields to the identification of the user making the request, the deleted_by system field to −1 (not deleted), and the name field to whatever name the user has provided. At 302, a unique identification may be automatically generated for the record and saved in the record.

Figure 4:
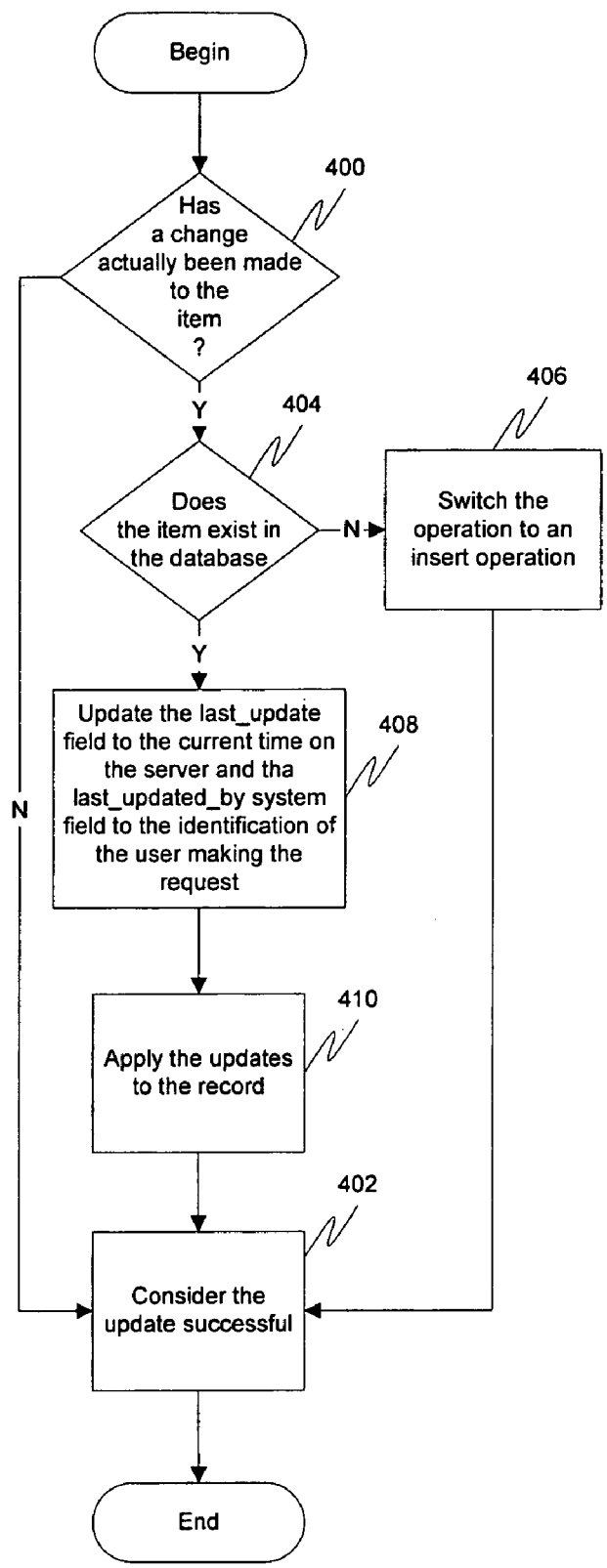
FIG. 4 is a flow diagram illustrating a method for updating an item in a database in accordance with an embodiment of the present invention.

FIG. 4 is a flow diagram illustrating a method for updating an item in a database in accordance with an embodiment of the present invention. Each act of this method may be performed by software, hardware, or any combination thereof. At 400, the system may confirm that a change was actually made to the item. It may accomplish this by keeping the original values when the item is first loaded and comparing them to the current values. If no change was actually made, then at 402 the update may be considered successful, even though no database operation is performed.

If a change was made, then at 404 the system may confirm that the item exists in the database. This may be accomplished by comparing the unique identification of the item with the identifications of the item in the database. If it does not exist, then at 406, the operation may be switched to an insert operation. This insert operation may differ from the insert operation described in FIG. 3 and the corresponding text by virtue of the fact that it does not need to generate a unique identification, as it already has one. The unique identification need only be saved. By switching to an insert operation, this ensures that records from separate databases can be easily replicated without having to worry about whether the item exists or not.

If a change has occurred and the item does exist in the database, then at 408, the system may update the last_update field to the current time on the server and the last_updated_by system field to the identification of the user making the request. Then at 410, the updates may be applied to the record.

Figure 5:
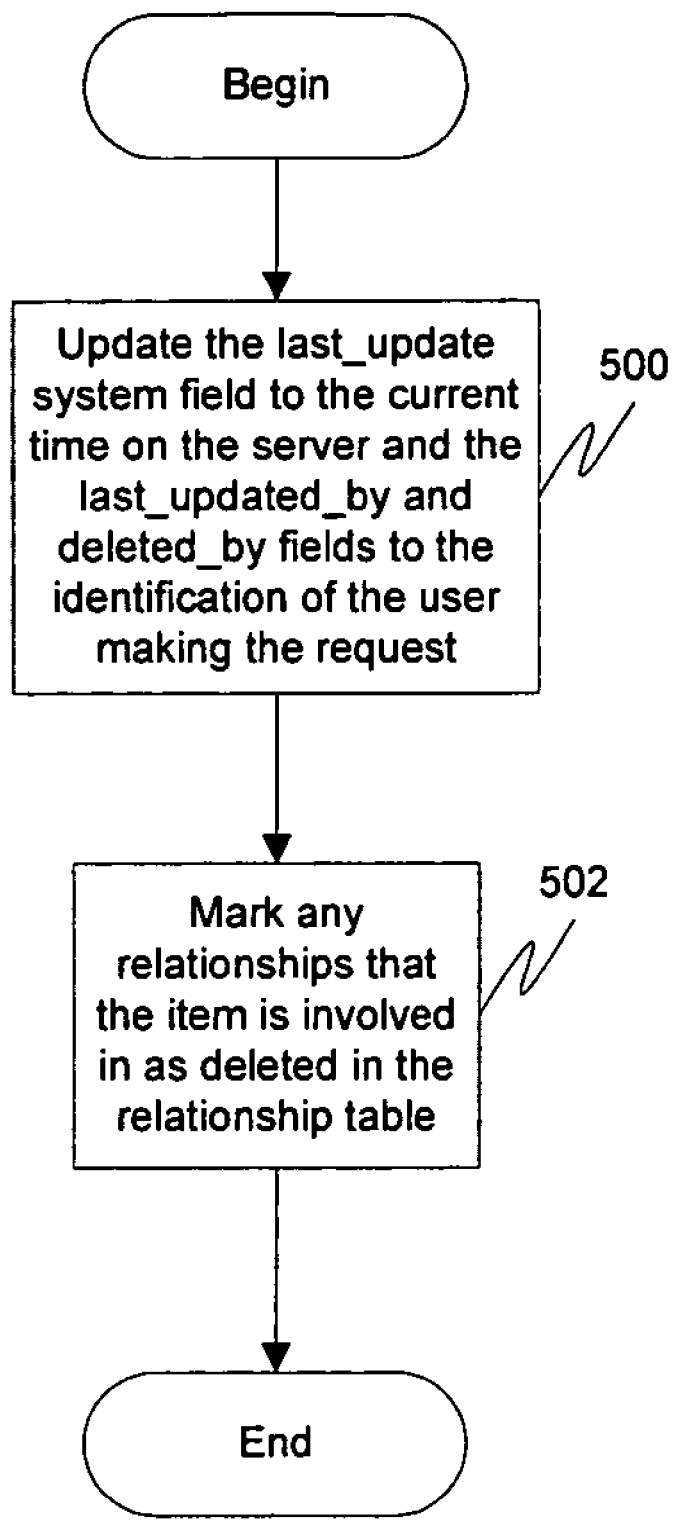
FIG. 5 is a flow diagram illustrating a method for deleting an item from a server in accordance with an embodiment of the present invention.

FIG. 5 is a flow diagram illustrating a method for deleting an item from a server in accordance with an embodiment of the present invention. Each act of this method may be performed by software, hardware, or any combination thereof. At 500, the system may update the last_update system field to the current time on the server, and the last_updated_by and deleted_by fields to the identification of the user making the request. Then, at 502, any relationships that the item is involved in may also be marked as deleted in the relationship table.

It should be noted that in an embodiment of the present invention, "deletion" means that the system field of for deleted_by is marked with a valid user identification. If the deleted_by field is less than zero, the item may be considered not deleted. Additionally, in an embodiment of the present invention, if the user requests that an item be deleted from a client database, then the item may simply be physically deleted from the database. This is due to the fact that client databases are typically transitory and are limited in available disk space.

Figure 6:
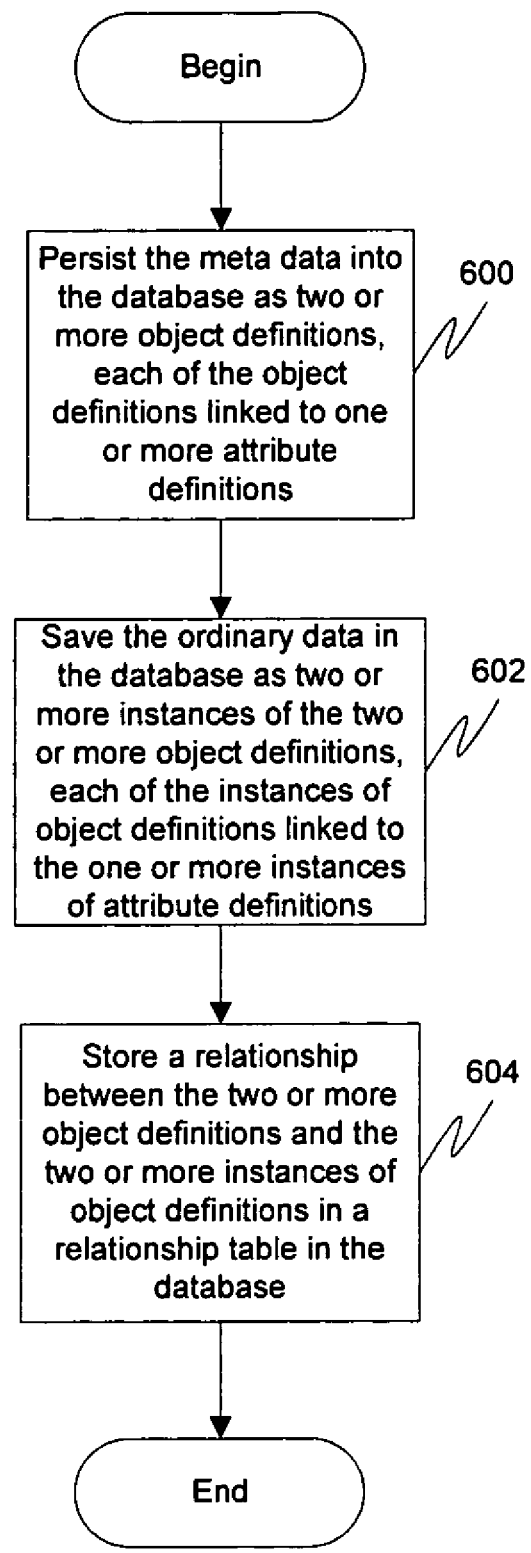
FIG. 6 is a flow diagram illustrating a method for storing data in a database in accordance with an embodiment of the present invention.

FIG. 6 is a flow diagram illustrating a method for storing data in a database in accordance with an embodiment of the present invention. Each act of this method may be performed by software, hardware, or any combination thereof. The data may contain ordinary data and meta data. At 600, the meta data may be persisted into the database as two or more object definitions, each of the objected definitions linked to one or more attribute definitions. The attribute definitions may optionally be linked to list definitions. Each object definition may include an identification, a name (which is in actuality a table name), a display name, a plural display name, an icon, a description, a system type, and security permissions. The system type may be private, public, or protected. Each attribute definition may include an identification, a name (which is in actuality a column name), a display name, a description, a data type, a data length, an input mechanism, a system type, various system options, and a list name. If the attribute definition contains a list name, then it is an indication that there is a list definition linked to the attribute definition. At 602, the ordinary data may be saved in the database as two or more instances of the two or more object definitions, each of the instances of object definitions linked to the one or more instances of attribute definitions. The instances of attribute definitions may optionally be linked to instances of list definitions. At 604, a relationship between the two or more object definitions and the two or more instances of object definitions may be stored in a relationship table in the database. This may be accomplished by storing an identification of a parent object definition and an identification of a parent instance of the parent object definition in a relationship table along with an identification of a child object definition and an identification of a child instance of the child object definition.

Figure 7:
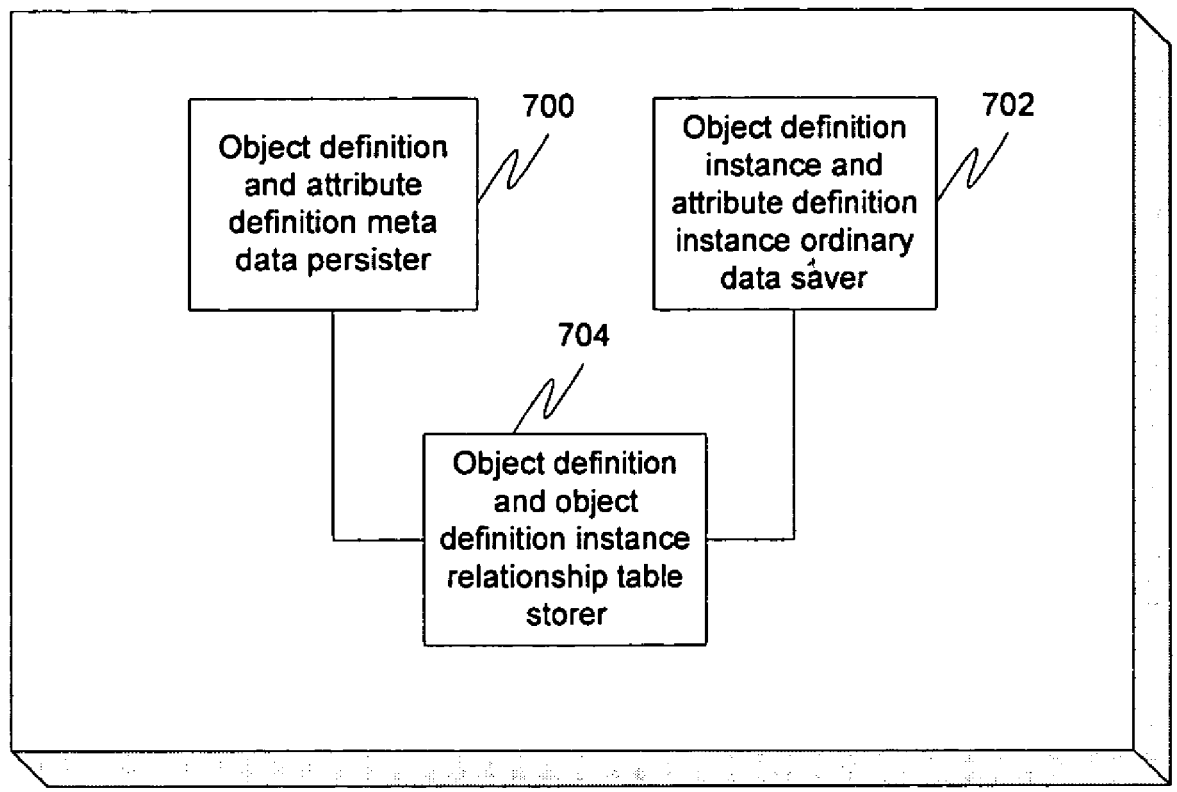
FIG. 7 is a block diagram illustrating an apparatus for storing data in a database in accordance with an embodiment of the present invention.

FIG. 7 is a block diagram illustrating an apparatus for storing data in a database in accordance with an embodiment of the present invention. Each element of this apparatus may be embodied in software, hardware, or any combination thereof. The data may contain ordinary data and meta data. An object definition and attribute definition meta data persister 700 may persist the meta data into the database as two or more object definitions, each of the objected definitions linked to one or more attribute definitions. The attribute definitions may optionally be linked to list definitions. Each object definition may include an identification, a name (which is in actuality a table name), a display name, a plural display name, an icon, a description, a system type, and security permissions. The system type may be private, public, or protected. Each attribute definition may include an identification, a name (which is in actuality a column name), a display name, a description, a data type, a data length, an input mechanism, a system type, various system options, and a list name. If the attribute definition contains a list name, then it is an indication that there is a list definition linked to the attribute definition. An object definition instance and attribute definition instance ordinary data saver 702 may save the ordinary data in the database as two or more instances of the two or more object definitions, each of the instances of object definitions linked to the one or more instances of attribute definitions. The instances of attribute definitions may optionally be linked to instances of list definitions. An object definition and object definition instance relationship table storer 704 coupled to the object definition and attribute definition meta data persister 700 and to the object definition instance and attribute definition instance ordinary data saver 702 may store a relationship between the two or more object definitions and the two or more instances of object definitions in a relationship table in the database. This may be accomplished by storing an identification of a parent object definition and an identification of a parent instance of the parent object definition in a relationship table along with an identification of a child object definition and an identification of a child instance of the child object definition.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A computer-implemented method for storing data in a database, the data containing ordinary data and meta data, the method comprising:

persisting the meta data in the database as at least a parent and a child object definition, each of said object definitions linked to one or more attribute definitions, each of said object definitions describing a format in which to store ordinary data, wherein each of said object definitions includes an identification and a table name;

saving the ordinary data in the database as at least a parent instance storing ordinary data in the format described by the parent object definition and a child instance storing ordinary data in the format described by the child object definition, each of said instances of object definitions linked to one or more instances of attribute definitions, wherein each of said attribute definitions includes an identification and a column name; and storing identifiers of said parent and child object definition and said parent and child instances of said parent and child object in a relationship table in the database, wherein said storing includes storing an identification of a parent object definition and an identification of a parent instance of said parent object definition in a relationship table along with an identification of a child object definition and an identification of a child instance of said child object definition.

2. The computer-implemented method of claim 1, wherein at least one of said attribute definitions is linked to a list definition.

3. The computer-implemented method of claim 2, wherein at least one of said instances of attribute definitions is linked to an instance of a list definition.

4. The computer-implemented method of claim 1, wherein each of said object definitions further includes a system type allowing the object definition to be defined as private, public, or protected.

5. The computer-implemented method of claim 1, wherein each of said attribute definitions further includes a system type allowing the attribute definition to be defined as private, public, or protected.

6. An apparatus for storing data in a database, the data containing ordinary data and meta data, the apparatus comprising:

a memory;

an object definition and attribute definition meta data persister configured to persist the meta data in the database as at least a parent and a child object definition, each of said object definitions linked to one or more attribute definitions, each of said object definitions describing a format in which to store ordinary data, wherein each of said object definitions includes an identification and a table name;

an object definition instance and attribute definition instance ordinary data saver configured to save the ordinary data in the database as at least a parent instance storing ordinary data in the format described by the parent object definition and a child instance storing ordinary data in the format described by the child object definition, each of said instances of object definitions linked to one or more instances of attribute definitions, wherein each of said attribute definitions includes an identification and a column name;

an object definition and object definition instance relationship table storer coupled to said object definition and attribute definition meta data persister and to said object definition instance and attribute definition instance ordinary data saver, configured to store identifiers of said parent and child object definition and said parent and child instances of said parent and child object in a relationship table in the database, wherein said storing includes storing an identification of a parent object definition and an identification of a parent instance of said parent object definition in a relationship table along with an identification of a child object definition and an identification of a child instance of said child object definition; and a processor configured to operate the object definition and attribute definition meta data persister, the definition instance and attribute definition instance ordinary data saver, and the object definition and object definition instance relationship table storer.

7. An apparatus for storing data in a database, the data containing ordinary data and meta data, wherein the meta data describes a name for each item of ordinary data, the apparatus comprising:

means for persisting the meta data in the database as at least a parent and a child object definition, each of said object definitions linked to one or more attribute definitions, each of said object definitions describing a format in which to store ordinary data, wherein each of said object definitions includes an identification and a table name;

means for saving the ordinary data in the database as at least a parent instance storing ordinary data in the format described by the parent object definition and a child instance storing ordinary data in the format described by the child object definition, each of said instances of object definitions linked to one or more instances of attribute definitions, wherein each of said attribute definitions includes an identification and a column name;

means for storing identifiers of said parent and child object definition and said parent and child instances of said parent and child object in a relationship table in the database, wherein said storing includes storing an identification of a parent object definition and an identification of a parent instance of said parent object definition in a relationship table along with an identification of a child object definition and an identification of a child instance of said child object definition; and a processor coupled to the means for persisting, the means for saving, and the means for storing.

8. The apparatus of claim 7, wherein at least one of said attribute definitions is linked to a list definition.

9. The apparatus of claim 8, wherein at least one of said instances of attribute definitions is linked to an instance of a list definition.

10. The apparatus of claim 7, wherein each of said object definitions further includes a system type allowing the object definition to be defined as private, public, or protected.

11. The apparatus of claim 7, wherein each of said attribute definitions further includes a system type allowing the attribute definition to be defined as private, public, or protected.

12. A program storage device readable by a machine, tangibly embodying a program of instructions executable by the machine to perform a method for storing data in a database, the data containing ordinary data and meta data, wherein the meta data describes a name for each item of ordinary data, the method comprising:

persisting the meta data in the database as at least a parent and a child object definition, each of said object definitions linked to one or more attribute definitions, each of said object definitions describing a format in which to store ordinary data, wherein each of said object definitions includes an identification and a table name;

saving the ordinary data in the database as at least a parent instance storing ordinary data in the format described by the parent object definition and a child instance storing ordinary data in the format described by the child object definition, each of said instances of object definitions linked to one or more instances of attribute definitions, wherein each of said attribute definitions includes an identification and a column name; and storing identifiers of said parent and child object definition and said parent and child instances of said parent and child object in a relationship table in the database, wherein said storing includes storing an identification of a parent object definition and an identification of a parent instance of said parent object definition in a relationship table along with an identification of a child object definition and an identification of a child instance of said child object definition.

* * * * *